Figure 5:
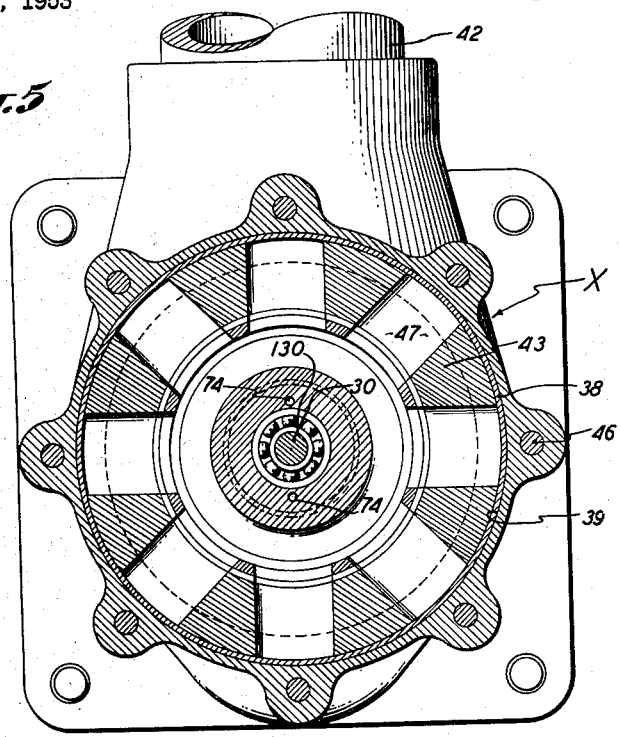

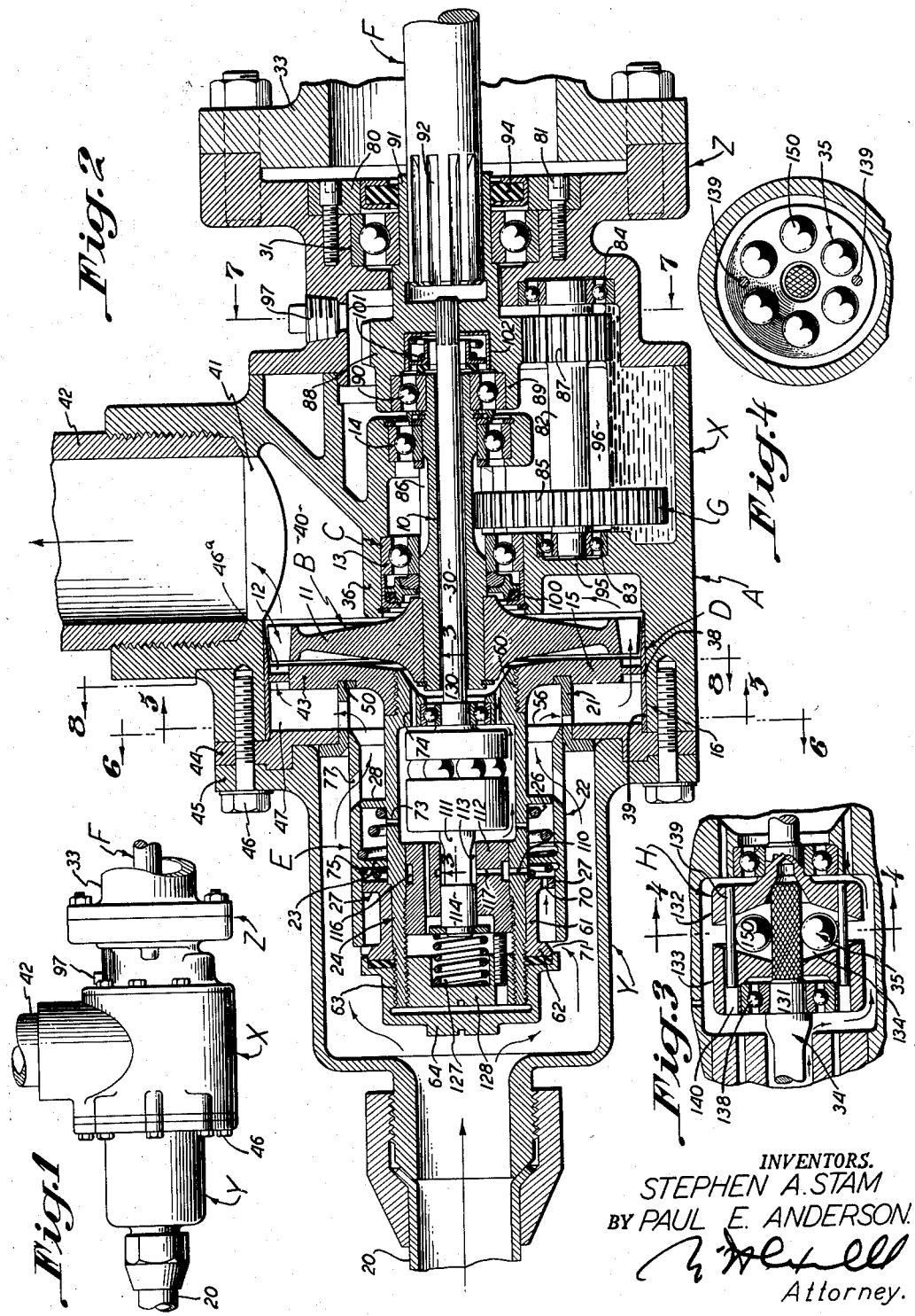

Aug. 12, 1958 P. E. ANDERSON ET AL 2,847,186
FLUID DRIVEN POWER UNIT
Filed Jan. 12, 1953 3 Sheets-Sheet 2

INVENTORS.
STEPHEN A. STAM
BY PAUL E. ANDERSON.
Attorney.

Aug. 12, 1958 P. E. ANDERSON ET AL 2,847,186
FLUID DRIVEN POWER UNIT
Filed Jan. 12, 1953 3 Sheets-Sheet 3
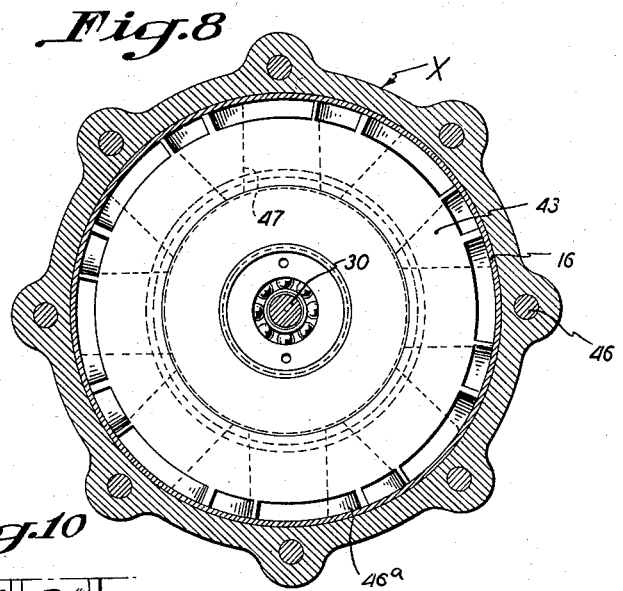
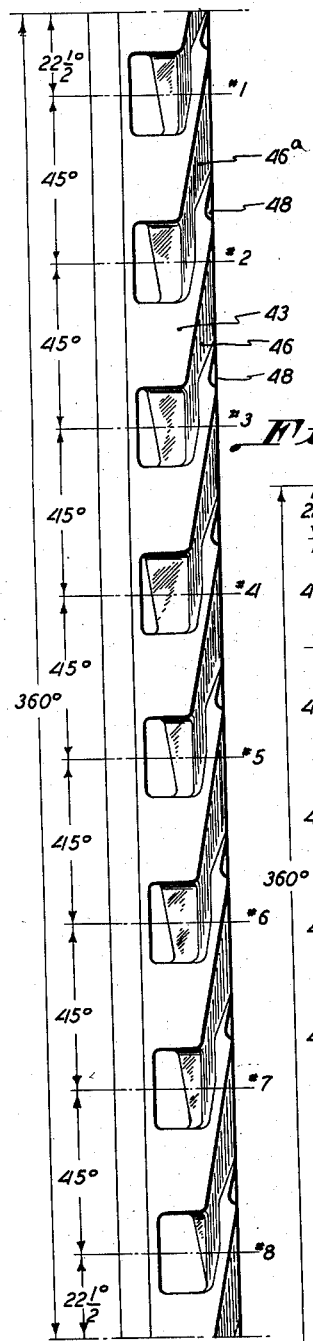
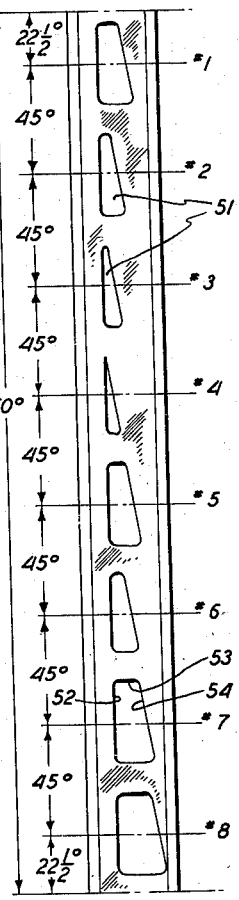
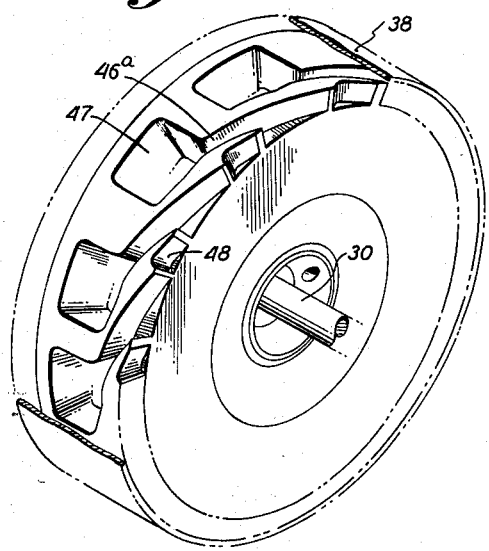
INVENTORS.
STEPHEN A. STAM
BY PAUL E. ANDERSON.
Attorney.

United States Patent Office

2,847,186
Patented Aug. 12, 1958

2,847,186

FLUID DRIVEN POWER UNIT

Paul E. Anderson, Los Angeles, and Stephen A. Stam, Glendale, Calif., assignors to Harvey Machine Co., Inc., Torrance, Calif., a corporation of California Application January 12, 1953, Serial No. 330,821

15 Claims. (Cl. 253—59)

This invention relates to a fluid driven power unit and it is a general object of the invention to provide a simple, practical, improved structure of this type for use where a fluid is available under pressure to be utilized as a medium for operating a unit serving to deliver power, as through a rotating shaft.

The device of the present invention is such that it can be used in various situations and it is contemplated that it may be varied widely to accommodate varying uses. As an example of one typical situation in which the device can be used, reference will be made to aircraft where air is available under compression, and where it is desired to drive a generator, a pump, or other such structure at a constant speed. The invention contemplates, broadly, a structure handling or driven by any suitable or available fluid, whether air, a gas, or a liquid. Since the embodiment of the invention herein set forth is designed to be driven by air we will refer to air as the fluid involved, but employ that term broadly, and mean to include any fluid that can be employed in carrying out the invention.

A general object of the present invention is to provide a power unit of the general character referred to which is such as to deliver power through a shaft operating at a constant speed under varying conditions, including varying pressure of the fluid available for driving the structure or variation of the load being operated or driven, or both.

Another object of this invention is to provide a power unit of the general character referred to which is of simple, practical, compact form and construction. In accordance with the present invention the mechanism is characterized by the essential elements arranged and related so that a unit of substantial capacity is of nominal size.

It is another object of the invention to provide a unit of the general character referred to wherein the various parts are of such form and construction as to be readily and economically manufactured and are such that they can be easily and quickly assembled.

It is a further object of the present invention to provide a unit of the general character referred to which is such as to gain very accurate speed control through a controlled or governed flow control valve or metering device, while at the same time being free of delicate parts difficult or expensive of manufacturing or likely to fail or be inaccurate in operation.

The power unit of the present invention is characterized by a body housing the various parts, and in the main portion or section of the body there is a rotor characterized by a tubular rotor shaft and a wheel on the shaft provided with blades at its periphery. Suitable bearings mounts the rotor in the body and a nozzle or air directing means is provided to direct fluid to the blades of the rotor to effect driving of the rotor. A metering means controls the flow of fluid supplied to the nozzles and is preferably characterized by a slide valve normally held open, as by a spring, and adapted to be moved toward a closed position by the pressure of the fluid being supplied to drive the unit. A driven shaft projects from the body and a drive is provided between the shaft of the rotor and the driven shaft. The drive preferably includes a speed reducing mechanism whereby the driven shaft operates substantially slower than the rotor shaft, though it is concentric therewith. A speed responsive means is provided to control or govern the action of the air metering means, and preferably includes a propeller shaft driven by the driven shaft and a couple between the propeller shaft and a bleed valve characterized by one or more elements operated centrifugally. The couple is such that as the speed of rotation of the propeller shaft increases the bleed valve is opened, bleeding operating pressure from the air metering means, with the result that the mechanism as a whole will operate at a predetermined speed under varying pressures of fluid supplied as the driving medium and under variations of the load imposed upon the driven shaft.

Figure 6:
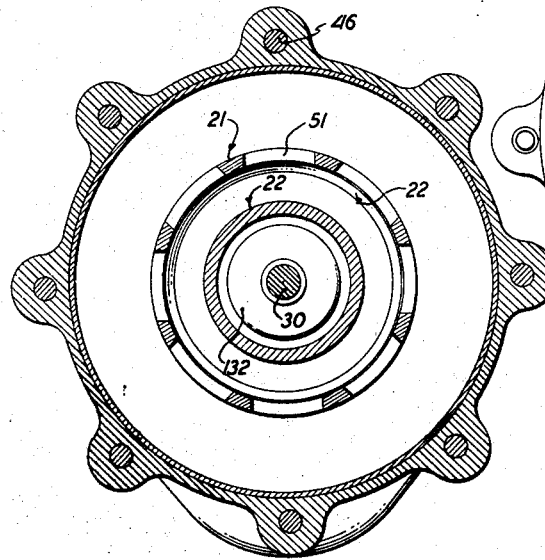
Figure 7:
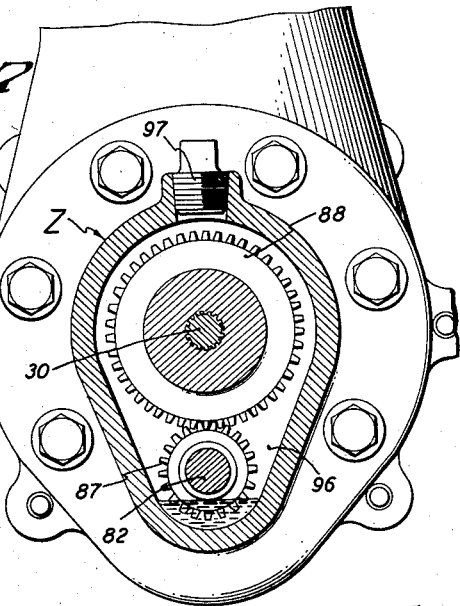

The various objects and features of our invention will be fully understood from the following detailed description of a typical preferred form and application of the invention, throughout which description reference is made to the accompanying drawing, in which:

Fig. 1 is a side elevation of the power unit as provided by the present invention. Fig. 2 is an enlarged longitudinal detailed sectional view of the unit. Fig. 3 is an enlarged, detailed sectional view of a part of the unit, being an enlarged view taken as indicated by line 3—3 on Fig. 2. Fig. 4 is a transverse sectional view taken as indicated by line 4—4 on Fig. 3. Fig. 5 is a transverse sectional view taken as indicated by line 5—5 on Fig. 2. Fig. 6 is a transverse sectional view taken as indicated by line 6—6 on Fig. 2. Fig. 7 is a transverse sectional view taken as indicated by line 7—7 on Fig. 2. Fig. 8 is a transverse sectional view taken as indicated by line 8—8 on Fig. 2. Fig. 9 is a somewhat diagrammatic view or developed layout illustrating the nozzle construction and porting employed in the construction. Fig. 10 is a view similar to Fig. 9 illustrating the orifice construction provided in the air metering means, and Fig. 11 is a perspective view illustrating certain parts of the nozzle structure as illustrated in Fig. 9, separate from other portions of the mechanism.

The structure provided by the present invention involves, generally, a body A which is preferably sectional, and which, in the case illustrated, includes a main or central section X, a front end or air supply section Y, and a rear end or shaft carrying section Z. A rotor B is located in the main section X of the body and is characterized by a shaft 10, a wheel 11 on the shaft 10, and blades 12 on the wheel. Suitable bearing means C supports the rotor shaft 10 in the body and preferably includes a front bearing 13 and a rear bearing 14. A nozzle or air directing means D is carried in or by the body and in a typical construction includes a nozzle plate 15 and a liner 16 surrounding the periphery of the plate and cooperating therewith to establish suitable openings or nozzles that direct air to the blades of the rotor. An air metering means E is provided and is located in the air supply section Y of the body which serves to conduct air from a supply duct 20 to the means D. The throttling means E is preferably a slide valve mechanism including a valve seat 21 cooperatively related to the plate 15 of means D, a sleeve type valve 22 cooperating with the seat, a piston element 23 carried by the valve 22 and slidably engaged with an extension 24 of the plate 15, and a spring 26 normally yieldingly holding the valve 22 in an open position. A mounting means for the valve 22 includes a forward flange 27 on projection 24 and a rear flange 28 on the extension 24, which flanges slidably engage the valve 22. A main driven shaft F is carried by the section Z of the body through a bearing 31 and projects from the body as into a housing 33, or the like. A drive means G is provided between the rotor shaft 10 and the driven shaft F and preferably serves to effect speed reduction as between the rotor shaft and driven shaft. A control means H governs the action of the metering means E responsive to the speed of operation of the shaft F and includes, generally, a propeller shaft 30 driven by the driven shaft F, a bleed valve 34 to bleed pressure tending to operate the piston 23, and a speed responsive actuating means 35 driven by the propeller shaft 30 and operating the valve 34. The unit includes various other elements and features of construction the details of which will be hereinafter set forth.

The body A may, in practice, be varied widely in form and construction, it being preferred however that it be of simple, sectional construction, and in the case illustrated it includes separable sections X, Y, and Z. The main or middle section X of the body, in effect houses or carries the rotor B, while the section Y, at what will be termed the front or forward end of the unit, serves as a housing for certain parts such as elements of the means E and H, and it serves as a duct carrying air from the supply duct 20 to the elements of the structure where the air is utilized. The section Z is located at the rear end of the structure and serves primarily as a support for the driven shaft F and also supports other elements, as will be hereinafter described.

The rotor B is located in and is preferably confined to the main section X of the body and the shaft 10 of the rotor, which is tubular in form, is mounted or located centrally of the unit or so that its axis is concentric with the central longitudinal axis of the structure. The wheel 11 of the rotor is fixed on the forward end portion of the shaft 10 and is provided at its periphery with a continuous annular series of blades 12.

The bearings 13 and 14 that support the rotor shaft 10 rotatably support that shaft centrally in the main section X of body A so that the axis of the shaft is concentric with the central longitudinal axis of the mechanism. The bearings 13 and 14 are anti-friction bearings carried in a central tubular core 36 rigidly supported in the main section A of the body through elements hereinafter described. The forward end of the core is adjacent but clear of the wheel 11 of the rotor, while the rear end of the core terminates short of the rear end of the main section X. The bearing 13 is located in the forward portion of the core 36 and supports the rotor shaft 10 adjacent the wheel 11, while the bearing 14 is in the rear end portion of the core 36 and supports the rear end portion of the rotor shaft.

The nozzle or air directing means D is carried by or is located in the forward end portion of the main body section X and delivers air rearwardly in the body and to the blades 12 to effect rotation or driving of the rotor. In the form illustrated the means D includes a cylindrical member of liner 38 carried in a bore 39 provided in the body section X from its forward end. The bore 39 and liner 38 extend longitudinally of the body section X from the forward end thereof to a chamber 40 that occurs centrally in the body section X which chamber is in communication with a lateral exhaust port 41 to which an exhaust pipe 42 may be connected.

The means D includes a nozzle plate 43 carried by the forward end portion of the body section X. The plate 43 is located within the liner 38 and its rear end terminates adjacent the forward side of the wheel 11. A mounting flange 44 on the plate 43 engages the forward end of body section X and is confined between the forward end of body X and a mounting flange 45 on body section Y. Suitable fastening means 46 connect the flange 45, the flange 44 and the forward end of body section X, as clearly illustrated in the drawings.

The nozzle plate 43 has a plurality of notch-like openings 46 entering it from its periphery and forming the nozzles that direct the air to the blades of the rotor. In the case illustrated the plate 43 has a plurality of radially disposed ports 47 through which air is fed radially outward to the nozzle openings 46. The openings 46 are suitably spaced around or in an annular series and they are shaped and proportioned to handle the air so that it is directed most advantageously as it flows from the ports 47 to the blades of the rotor. Drag relieving recesses 48 are provided in the rear side of the plate 43 between the points where the openings 46 open toward the blades, as clearly shown in Fig. 11 of the drawings.

From the foregoing description it will be apparent how the liner 38 and nozzle plate 43 cooperate with body section X, closing the outer ends of the ports 47 and forming outer walls for the openings 46 so that there is a simple, practical construction by which air is conducted radially through the plate 43 and then directed axially and tangentially through the nozzle openings 46 to act on the blades 12 and effectively and efficiently drive the rotor. The air throttling means E controls the flow of air handled by body section Y to the means D, and more specifically to the ports 47 of means D. The air throttling means includes a shiftable valve, preferably a sleeve type valve 22, that cooperates with an annular seat 21. In the preferred construction an annular recess 50 is provided in the plate 43 inward of the ports 47 and the valve seat 21 is in the form of an annular insert carried in the recess to occur between the flange 44 and the plate 43. The recess 50 enters the plate 15 from the front side thereof and the insert forming the seat 21 is preferably a part formed separate from the plate and engaged therewith, as shown in the drawings, in order to simplify manufacture.

In accordance with the present invention flow orifices are provided in or through the annular valve seat. The orifices 51 are in an annular series extending around the seat and they are of various sizes or shapes. In the preferred form of the invention the orifices 51 are formed so that each has a straight forward wall 52, straight parallel side walls 53, and a straight pitched or inclined rear wall 54. The front walls 52 of the several orifices 51 are parallel, in fact, they are preferably in a common plane normal to the axis of the structure, and the side walls 53 of the several orifices are preferably equally spaced apart so that each orifice is of the same circumferential extent. The rear walls 54 are spaced various distances rearward of the front walls so that the orifices 51 vary in size or capacity, as will be apparent from Fig. 10 of the drawings.

The valve 22, being a sleeve valve, slidably enters the forward end of the valve seat 21 and its rear end 56, which is flat or straight and in a plane normal to the axis of the structure, cooperates with the orifices 51 in the control of air flow from recess 50 to the ports 47. It will be apparent that as the valve sleeve 22 is moved axially, for instance, rearwardly from a position such as is shown in Fig. 2 of the drawings, it will decrease the effective size or capacity of each orifice 51 and as it moves or progresses rearwardly it will completely cut out the orifices one after another, and may reach a position where only the orifice 51 of maximum axial extent is passing air. Through this action the nozzle openings 46a are maintained in satisfactory operating condition and the structure is controlled so that it varies from a condition under which all of the nozzle openings 46a are operating at substantially full capacity, to a condition where but one nozzle opening is operating at substantially full capacity. This successive cutting out of the nozzle openings 46a results in far more efficient or effective operation than would be the case if the action were such as to gradually reduce or bean down the orifices 51 until they were all severely choked and all operating uniformly. This is true in that a mechanism of the character under consideration operates most efficiently when there is a flow of air through the nozzle openings and to the blades of a velocity and volume for which the parts are designed, and throttling, as such, reduced to a minimum.

The mounting means for the sleeve valve 22 includes the extension 24 of the plate 43, which extension is located centrally of the structure and projects forward from the plate well into the body section Y. In the case illustrated the extension 24 is shown as formed separate from the plate 43 and as joined thereto by a threaded connection 60. The extension 24 fits in or projects forwardly through the valve 22 with substantial clearance and a rear valve supporting flange 28 projects from the extension 24 and slidably supports the rear end portion of the valve 24. A head 61 carried on the forward end portion of extension 24 and forming a part thereof has the flange 27 projecting therefrom and slidably supports the forward portion of the valve 22. The head 61 has a stop flange 62 projecting from it and serving to limit forward movement of valve 22. The head 61 in the case illustrated is held on the extension 24 by a threaded connection. A retainer 64 for the head 61 is threaded on the extension 24 as at 63 and retains the head on the extension 24 and closes the forward end of the extension.

The piston 23 integrally related to valve 22 is an annular piston carried by the valve 22 and projecting inwardly therefrom to slidably engage the extension 24 between the supporting flanges 27 and 28. An air inlet port 70 is provided in the forward valve supporting flange 27 and air passing notches 71 are provided in the stop flange 62 of head 61 so that air being handled by the body section Y is admitted into the valve 22 at the forward side of the piston 23 to act upon the piston 23 and then to force or move the valve rearwardly.

The spring 26 provided to normally yieldingly urge the valve 22 forwardly or to the open position is preferably a helical compression spring arranged around the extension 24 between the rear supporting flange 28 and the rear side of piston 23. The spring 26 is such as to normally yieldingly hold the valve 22 in a forward position where it is open, and it is such that when the pressure of air acting on piston 23 exceeds a predetermined value it yields, allowing the valve 22 to move rearwardly and consequently meter or reduce the flow of air through the seat 21. One or more small air bleeding ports 73 are provided in the extension 24 between the piston to the interior of the extension 24 from whence it may escape through air bleeding ports 74 in the rear end of extension 24 to enter the cavity or chamber 40 occurring in body section X.

In the preferred construction a suitable cushioning spring 75 is provided around the extension 24 by the flange 27 and piston 23, as clearly illustrated in the drawings. With the general construction and arrangement thus far described air admitted to body section Y flows longitudinally through the body section and around the valve 22 until it reaches the rear end portion of valve 22 where it is passed into the valve 22 through inlet ports 77. From the rear end of valve 22 the air enters recess 50 and it flows from recess 50 to the radial ports 47 under the control of the valve 22. Through the construction above described it will be apparent that as pressure on the air increases in body section Y in a manner that normally would tend to increase the speed of rotation of rotor B, the valve 22 is operated and effects a metering of the air flow to the blades of the rotor and, consequently, there is a general control of the rotor responsive to the pressure of fluid supplied to the structure. It should be noted however, that this fluid pressure control of the rotor is an indirect control only, the valve being directly responsive to and controlled by the speed responsive means H.

The main power shaft F is provided at the shaft carrying section Z of body A and projects rearwardly therefrom. The shaft F is preferably supported in body section Z as by means of the anti-friction bearing 31, so that it is concentric with the rotor and the other working parts thus far described. The anti-friction bearing 31 is shown supported directly in body section Z where it is retained by a suitable retainer 80 held by fasteners 81. The drive means G provided between the shaft 10 of the rotor B and the driven shaft F is preferably a speed reducing gear drive. In the construction illustrated the rotor B is such as to operate at a very high speed and it is desired that there be a substantial speed reduction gained between the rotor shaft 10 and the driven shaft F.

The drive means G illustrated in the drawings effects a speed reduction between the shafts and it is shown as including a counter-shaft 82 supported in the body A by anti-friction bearings 83 and 84. The bearing 83 supports the forward end of the counter-shaft 82 in the main section X of the body, while the bearing 84 supports the rear end of the counter-shaft in the body section Z. A large gear 85 on the forward end portion of shaft 82 meshes with gear teeth 86 provided on the rotor shaft 10 between bearings 13 and 14, with the result that 10 the countershaft 82 is driven from the shaft 10. The teeth 86 on the shaft 10 form a drive pinion considerably smaller in diameter than the gear 85, with the result that there is a substantial speed reduction between shaft 10 and the countershaft 82. A small pinion 87 on the rear end portion of the countershaft 82 meshes with and drives a drive gear 88 which is substantially larger than the pinion 87 and which is mounted concentric with the driven shaft F. The gear 88 has a forwardly projecting tubular extension 87 carrying an anti-friction bearing 90 supported on the rear end portion of the rotor shaft 10. A rearwardly projecting tubular extension 91 of gear 88 extends over the forward end portion of shaft F and into the bearing 31 so that it is, in effect, interposed between these parts. A suitable driving connection is provided between the gear extension 91 and the shaft F and may be formed by engaging splines 92.

A suitable sealing means 94 is provided at the rear end portion of the structure as between the extension 91 of the gear 88 and the retainer 80 of bearing 31 which is, in effect, a part of body section Z. This seal serves to prevent leakage from the rear end portion of the structure.

In accordance with the present invention the body section Y is provided with walls 95 serving to house the drive gears, as hereinabove described, to form suitable supports for the various bearings within the body section X and also a support for the core 36 hereinabove described. The walls 95 are so formed as to establish a closed chamber 96 in the body housing the gears or working elements of means G and parts such as the bearings 13 and 14. The chamber 96 is accessible through an opening closed by a plug 97 and may carry a suitable lubricant as indicated in the drawings. A sealing means 100 is provided at the forward end of core 36 around the rotor shaft 10 and between the wheel 11 and the bearing 13 to prevent leakage of lubricant from chamber 96 into the chamber 40 or passage of air from chamber 90, as shown in Fig. 2.

The particular sealing means 100 illustrated, in the drawings, is more fully set forth and is the subject of our copending application entitled, "Fluid Seal," Serial No. 330,823, filed on even date herewith. A sealing means 101 is provided between the gear 88 and the rear end of rotor shaft 10 and in the case illustrated includes a spring pressed sealing assembly slidable in a case 102 carried in the gear 88 and sealing against the end of the shaft 10 or a part thereon, such as a race of the bearing 90, as shown in Fig. 2.

The control means H governs the action of the metering means E responsive to speed and in the form of the invention herein set forth it is responsive to the speed of the parts driven by the air passed by the metering means E. More specifically, in the case illustrated the means H governs the metering means E responsive to the speed at which the shaft F is driven, and it serves to effect an accurate regulation of the action of the unit to the end that the shaft F operates at a substantially uniform speed regardless of variations in the load occurring on the shaft F.

The means H is, in effect, a valve controlled means serving to bleed pressure from space between the flange 27 and valve 22 of means E. In the construction illustrated a pressure relieving port 110 is provided in the extension 24 of the plate 43 at a point between the piston 23 and the supporting flange 27. A slide valve 111, in effect a needle type valve, is provided centrally within extension 24 and cooperates with a seat member 112 to control flow of air through port 110. In the construction illustrated the seat member 112 is threaded into the extension 24 forming its forward end and has a central opening 113 accommodating a forward stem 114 of the valve 111. An annular recess 116 is provided in the exterior of the valve member 112 and communicates with port 110 and a radial port 117 connects the recess 116 with the opening 113. The valve 111 is engaged in the opening 113 from its rear end and when in the forward position seats against the valve member 112 and closes the opening 113.

A spring means is provided normally tending to open valve 111 as by moving it rearwardly. In the construction illustrated this means includes a helical compression spring 127 carried between a plug 128 in the forward end of the extension 24 and the forward stem 114 of valve 111.

A speed responsive means is provided to operate the valve 111 and is such as to so control the action of the metering means E as to cause the means E to reduce the flow of air to the rotor as the speed of shaft F increases. With the construction illustrated, under normal conditions and assuming the valve 111 open or partly open, air from body section Y is admitted to the piston 23 as hereinabove described, and moves it rearwardly. However, there is a partial drainage of air and consequent relief of pressure through the ports 116 and 117 and air escapes past valve 111 through extension 24 and out through ports 74 provided in communication with chamber 40. The speed responsive means serves to move the valve 111 forward and consequently choke down the flow of escaping air, and if the speed of shaft F is great enough it may close valve 111 so that there is a maximum effect of air pressure on piston 23, causing means E to close.

The speed responsive means as provided by the invention includes the propeller shaft 30 that extends through the tubular rotor shaft 10 and which has its rear end coupled to the gear 88 so that it is rotated therewith and consequently is, in effect, driven by or with the shaft F. The propeller shaft 30 projects forward from the rotor shaft and its forward end portion is carried by an anti-friction bearing 130 supported centrally in the plate 43. A coupling means is provided between the propeller shaft 30 and a rearwardly projecting stem 131 on valve 111 and is characterized by the centrifugally operated elements 35. In the case illustrated the coupling between the propeller shaft 30 and the valve includes opposed heads 132 and 133 which define a chamber 134 in which the members 35 are located. The head 132 is fixed on the end of the propeller shaft while the head 133 is supported on the valve stem 131 through an anti-friction bearing 138.

A suitable drive connection is provided between the heads 132 and 133 so that these parts rotate together, and in the case illustrated it includes drive pins 139 into guideways 140 in head 133. In accordance with the invention the chamber 134 as defined by the heads 132 and 133 is conical in form or outwardly convergent, and in the particular case illustrated the opposing faces of the two heads are conical in form, as clearly illustrated in Fig. 3 of the drawings. The members or elements 35 are adapted to be operated by centrifugal force and are confined between the opposing faces of the heads 132 and 133. The construction is such that when the head 133 is in a rearward position, to which it is forced by the spring 127 and under which condition the valve 111 is open, the balls 35 are in or approach the center of the mechanism.

As the propeller shaft 30 rotates the head 32 is rotated and drives the head 33 which rotates freely on the stem 131 of the valve. As the speed of propeller shaft 30 increases the radial force or pressure created by the balls 35 increases and when the speed is sufficient this radial force or pressure will overcome the force of spring 127 and will serve to move the head 133 forward and, consequently, move the valve 111 toward a closed position. When the speed of the shaft 30 is up to a predetermined value the balls will have moved out to a position where the head 133 is forced forward, causing the valve 111 to be closed. Under this condition the air in the body section Y has a maximum effect upon the piston 23 so that there is a maximum metering action reducing the flow of air to the rotor.

In the preferred form of the means H the mechanism responsive to centrifugal action includes a lubricant carrying core 150 located centrally of the mechanism and preferably extending between the heads 132 and 133. This element may, in practice be a body of felt or the like, wet with or bearing a lubricant such as oil. When the balls 35 are in they contact the element 150 and as a result of this the mechanism is kept effectively lubricated.

The throttle means E and the speed responsive means H cooperating with the means E are such as to be useful in situations different from the one herein set forth, and these elements are set forth and are specifically claimed in copending application Serial No. 330,822 entitled Control Mechanism.

Having described only a typical preferred form and application of our invention, we do not wish to be limited or restricted to the specific details herein set forth, but wish to reserve to ourselves any variations or modifications that may appear to those skilled in the art and fall within the scope of the following claims:

Having described our invention, we claim:

1. A fluid driven power unit of the character described including, a body adapted to conduct a stream of driving fluid, a rotor carried in the body and driven by the fluid, a throttle to control flow of fluid to the rotor and positioned by a piston in axial alignment with the rotor and responsive to the pressure of fluid in the body, and an independent control means driven by the rotor and responsive to the speed of operation of the rotor and including, a shiftable pressure releasing valve within the piston and governing the fluid pressure acting on the piston to control flow of fluid to the rotor, and a speed responsive means driven from the rotor and positioning the pressure releasing valve.

2. A fluid driven power unit of the character described including, a body adapted to conduct a stream of driving fluid, a rotor carried in the body and driven by the fluid, a throttle to control flow of fluid to the rotor and positioned by a piston in axial alignment with the rotor and responsive to the pressure of fluid in the body, and an independent control means driven by the rotor and responsive to the speed of operation of the rotor, the said throttle including a shiftable fluid valve actuated by the piston to control the flow of fluid to the rotor, said control means including a shiftable pressure releasing valve within the piston and governing the fluid pressure acting on the piston, and a speed responsive means positioning the releasing valve and driven from the rotor.

3. A fluid driven power unit of the character described including, a body adapted to conduct a stream of driving fluid, a rotor carried in the body and driven by the fluid, a throttle to control flow of fluid to the rotor and positioned by a piston in axial alignment with the rotor and responsive to the pressure of fluid in the body, and an independent control means driven by the rotor and responsive to the speed of operation of the rotor and including, a shiftable pressure releasing valve within the piston and governing the fluid pressure acting on the piston to control flow of fluid to the rotor, and a centrifugally actuated means positioning the pressure releasing valve and driven from the rotor.

4. A fluid driven power unit of the character described including, a body adapted to receive driving fluid, a rotor carried in the body and driven by the fluid, a throttle to control flow of fluid to the rotor and positioned by a piston responsive to the pressure of fluid in the body, and an independent control means driven by the rotor and responsive to the speed of operation of the rotor, the said throttle including a shiftable sleeve valve in axial alignment with the rotor and actuated by the piston to control flow of fluid to the rotor, and the said control means including a shiftable pressure releasing valve within the sleeve valve and positioned by a speed responsive means driven by the rotor to govern the fluid pressure acting on the piston.

5. A fluid driven power unit of the character described including, a body adapted to receive driving fluid, a rotor carried in the body and driven by the fluid, a throttle to control flow of fluid to the rotor and positioned by a piston responsive to the pressure of fluid in the body, and an independent control means driven by the rotor and responsive to the speed of operation of the rotor, the said throttle including a shiftable sleeve valve in axial alignment with the rotor and actuated by the piston to control flow of fluid to the rotor, the said control means including, a shiftable pressure releasing valve within the sleeve valve to govern the fluid pressure acting on the piston, and centrifugally actuated means within the sleeve valve coupled to and positioning the pressure releasing valve.

6. A fluid driven power unit of the character described including, a body adapted to receive driving fluid, a rotor carried in the body and driven by the fluid, a throttle to control flow of fluid to the rotor and positioned by a piston responsive to the pressure of fluid in the body, and an independent control means driven by the rotor and responsive to the speed of operation of the rotor, the said throttle including a shiftable sleeve valve in axial alignment with the rotor and actuated by the piston to control flow of fluid to the rotor, the said control means including a shiftable pressure releasing valve within the sleeve valve to govern the fluid pressure acting on the piston, there being an element in the body rigid therewith and carrying both of said valves.

7. A fluid driven power unit of the character described including, a body adapted to receive driving fluid, a rotor carried in the body and driven by the fluid, a throttle to control flow of fluid to the rotor and positioned by a piston responsive to the pressure of fluid in the body, and an independent control means driven by the rotor and responsive to the speed of operation of the rotor, the said throttle including a shiftable sleeve valve in axial alignment with the rotor and actuated by the piston to control flow of fluid to the rotor, the said control means including a shiftable pressure releasing valve within the sleeve valve to govern the fluid pressure acting on the piston, there being an element in the body rigid therewith and carrying both of said valves, said element having openings therein directing fluid from the sleeve valve to the rotor.

8. A fluid driven power unit of the character described including, a body adapted to receive driving fluid, a rotor carried in the body and driven by the fluid, a throttle to control flow of fluid to the rotor and positioned by a piston responsive to the pressure of fluid in the body, and an independent control means driven by the rotor and responsive to the speed of operation of the rotor, there being an element in the body with radial orifices, each with a nozzle opening receiving fluid and directing it to the rotor, the said throttle including a shiftable valve actuated by the piston and varying the orifices in said element to control the flow of fluid to the rotor.

9. A fluid driven power unit of the character described including, a body adapted to receive driving fluid, a rotor carried in the body and driven by the fluid, a throttle to control flow of fluid to the rotor and positioned by a piston responsive to the pressure of fluid in the body, a driven shaft carried by the body, a drive in the body from the rotor to the shaft and an independent control means driven with the shaft and adapted to vary the fluid pressure acting on the piston and responsive to the speed of operation of the shaft, the rotor including a blade carrying wheel, the throttle being located in the body in one direction axially of the wheel, the drive and driven shaft being located in the other direction axially of the wheel, and the speed responsive means including a drive member extending from a point adjacent the shaft, through the wheel and to a point adjacent the throttle.

10. A fluid driven power unit of the character described including, a body adapted to receive driving fluid, a rotor carried in the body and driven by the fluid, a throttle to control flow of fluid to the rotor and positioned by a piston responsive to the pressure of fluid in the body, a driven shaft carried by the body, a drive in the body from the rotor to the shaft, and an independent control means driven with the shaft and adapted to vary the fluid pressure acting on the piston and responsive to the speed of operation of the shaft, the rotor including a tubular shaft and a blade carrying wheel on the tubular shaft, the throttle being located in the body in one direction axially of the wheel, the drive and driven shaft being located in the other direction axially of the wheel, and the speed responsive means including a propeller shaft driven with the driven shaft and extending through the tubular shaft from a point adjacent the driven shaft to a point adjacent the throttle.

11. A fluid driven power unit of the character described including, a body adapted to receive driving fluid, a rotor carried in the body and driven by the fluid, a throttle to control flow of fluid to the rotor and positioned by a piston responsive to the pressure of fluid in the body, a driven shaft carried by the body, a drive in the body from the rotor to the shaft, and an independent control means driven with the shaft and adapted to vary the fluid pressure acting on the piston and responsive to the speed of operation of the shaft, the rotor including a tubular shaft and a blade carrying wheel on the tubular shaft, the throttle being located in the body in one direction axially of the wheel, the drive and driven shaft being located in the other direction axially of the wheel, the said control means including, a propeller shaft driven with the driven shaft and extending through the tubular shaft from a point adjacent the driven shaft to a point adjacent the throttle, a pressure releasing valve, and a coupling between the propeller shaft and the releasing valve including an operating element actuated by centrifugal force.

12. A fluid driven power unit of the character described including, a body adapted to receive driving fluid, a rotor carried in the body and driven by the fluid, a throttle to control flow of fluid to the rotor and positioned by a piston responsive to the pressure of fluid in the body, a driven shaft carried by the body, a drive in the body from the rotor to the shaft, and an independent control means driven with the shaft and adapted to vary the fluid pressure acting on the piston and responsive to the speed of operation of the shaft, the rotor including a tubular shaft and a blade carrying wheel on the tubular shaft, the throttle being located in the body in one direction axially of the wheel, the drive and driven shaft being located in the other direction axially of the wheel, the said control means including, a propeller shaft driven with the driven shaft and extending through the tubular shaft from a point adjacent the driven shaft to a point adjacent the throttle, a pressure releasing valve, and a coupling between the propeller shaft and the releasing valve including an operating element actuated by centrifugal force, the throttle including a sleeve valve surrounding the releasing valve and the coupling.

13. A fluid driven power unit of the character described including, a body adapted to receive driving fluid, a rotor carried in the body and driven by the fluid, a throttle to control flow of fluid to the rotor and positioned by a piston responsive to the pressure of fluid in the body, a driven shaft carried by the body concentric with the rotor, a drive in the body from the rotor to the shaft, and an independent control means driven with the shaft and responsive to the speed of operation of the shaft and adapted to vary the fluid pressure acting on the piston, the drive including a gear train with a driven gear on the driven shaft and concentric with the rotor, said gear train having driving engagement with a gear on the rotor.

14. A fluid driven power unit of the character described including, a body adapted to receive driving fluid, a rotor carried in the body and driven by the fluid, a throttle to control flow of fluid to the rotor and positioned by a piston responsive to the pressure of fluid in the body, a driven shaft carried by the body concentric with the rotor, a drive in the body from the rotor to the shaft, and an idependent control means driven with the shaft and responsive to the speed of operation of the shaft and adapted to vary the fluid pressure acting on the piston, the drive including, a gear train with a driven gear on the driven shaft and concentric with the rotor, and a countershaft having a gear driven from the rotor and carrying a pinion driving the driven gear.

15. A fluid driven power unit of the character described including, an elongate body adapted to receive driving fluid at one end and having an exhaust opening, a rotor carried in the body including a tubular rotor shaft and a blade carrying wheel on the rotor shaft, a driven shaft carried by the body concentric with the rotor and projecting from the other end thereof, a speed reducing drive from the rotor shaft to the driven shaft, means in the body directing fluid received by the body to the blades of the rotor, a throttle in the body between the wheel and the first mentioned end of the body adapted to control flow of fluid to said means and positioned by a piston responsive to the pressure of fluid in the body, and an independent control means driven from the rotor and responsive to the speed of the rotor and adapted to vary the fluid pressure acting on the piston and including, a propeller shaft driven with the driven shaft and extending through the rotor shaft to the throttle, and a centrifugally actuated means at the throttle and operated by the propeller shaft to control the pressure acting on the piston to position the throttle.

References Cited in the file of this patent

UNITED STATES PATENTS

| | | |
|---|---|---|
| 552,396 | Pyle | Dec. 31, 1895 |
| 948,791 | Nikonow | Feb. 8, 1910 |
| 1,020,703 | Kieser | Mar. 19, 1912 |
| 1,093,116 | Cubelic | Apr. 14, 1914 |
| 1,415,981 | Bouche | May 16, 1922 |
| 1,504,738 | Brown | Aug. 12, 1924 |
| 2,206,723 | Graham | July 2, 1940 |
| 2,612,757 | Teague | Oct. 7, 1952 |
| 2,651,493 | Volk | Sept. 8, 1953 |

FOREIGN PATENTS

| | | |
|---|---|---|
| 277,111 | Switzerland | Nov. 1, 1951 |
| 501,076 | Belgium | Feb. 28, 1951 |